United States Patent [19]
Morita

[11] Patent Number: 5,510,657
[45] Date of Patent: Apr. 23, 1996

[54] HEADLIGHT CONTROL CIRCUIT OF SNOWMOBILE

[75] Inventor: Masahisa Morita, Hamamatsu, Japan

[73] Assignee: Suzuki Motor Corporation, Tokyo, Japan

[21] Appl. No.: 344,084

[22] Filed: Nov. 23, 1994

[30] Foreign Application Priority Data

Nov. 30, 1993 [JP] Japan ........................... 5-326338

[51] Int. Cl.⁶ ........................................... B60Q 1/26
[52] U.S. Cl. .................... 307/9.1; 315/79; 315/82
[58] Field of Search ................... 307/9.1, 10.1, 307/10.8, 129; 315/77–80, 82, 83; 340/441

[56] References Cited

U.S. PATENT DOCUMENTS

| | | | |
|---|---|---|---|
| 3,909,619 | 9/1975 | Kniesly et al. | 315/83 |
| 4,011,460 | 3/1977 | Kniesly et al. | 307/10.8 |
| 4,015,137 | 3/1977 | Kniesly et al. | 315/82 |
| 4,686,423 | 8/1987 | Eydt | 315/80 |
| 5,382,877 | 1/1995 | Katsumata et al. | 315/82 |

Primary Examiner—William M. Shoop, Jr.
Assistant Examiner—Richard T. Elms
Attorney, Agent, or Firm—Arnold, White & Durkee

[57] ABSTRACT

In a power supply circuit of a snowmobile in which an AC voltage of a magneto 51 is converted into a DC voltage to charge a battery 53 and electric power is supplied to an ECU 58 through a power relay 55 in response to turning on of a main switch 54 to inject fuel to an engine, a light relay 1 is provided to supply electric power from the battery 53 to electric loads such as headlights and the like and the ECU 58 judges a frequency of the AC voltage generated by the magneto 51 and control to turn on or off the light relay 1 in accordance with whether the frequency exceeds a predetermined value or not. Further, in the power supply circuit of the snowmobile, there are provided frequency-to-voltage conversion means 30 for converting the frequency of the AC voltage generated by the magneto 51 into a voltage and transistor circuits 24, 25 and 26 for controlling to supply electric power to electric loads 27 such as headlights and the like from the battery 52 or not to supply it in accordance with whether the frequency exceeds the predetermined value or not.

2 Claims, 4 Drawing Sheets

HEADLIGHT CONTROL CIRCUIT OF SNOWMOBILE

FIELD OF THE INVENTION AND RELATED ART STATEMENT

The present invention relates a headlight control circuit of a snowmobile and more particularly to a system for automatically controlling to turn on and off electric loads such as headlights of the snowmobile including an EFI (Electronic Fuel Injection) system.

A snowmobile includes headlights, taillights, brakelights, a warmer of a steering wheel and the like as electric loads. Generally, these electric loads are always used or operated during traveling of the snowmobile in view of characteristics of the snowmobile for traveling on snow.

The snowmobile is required to adopt a configuration in which the always used loads can be automatically controlled to be prevented from forgetting that the loads are turned off upon stop of the snowmobile.

The electric loads such as the headlights, the taillights, the brakelights, the warmer of the steering wheel and the like of the snowmobile are usually supplied with electric power by a magneto. That is, electric power generated in a coil wound on a stator by rotation of permanent magnets provided in a rotor coupled with an engine charges a battery, which is used as a power supply to turn on the headlights and the like.

FIG. 4 is a schematic diagram illustrating a conventional headlight control circuit of a snowmobile. In FIG. 4, numeral 51 denotes a magneto which includes three-phase windings and generates three-phase AC electric power in response to rotation of an engine. Electric power generated by the magneto 51 is converted into a DC voltage and the voltage is controlled by a three-phase regulator 52 to charge a battery 53.

Further, numeral 54 denotes a main switch. When the main switch 54 is on, a power relay 55 is operated to supply the DC voltage (for example, DC 15 V) to an EFI system and other portions. When an engine is driven under this state, an AC signal generated by a pulser coil 57 provided in the magneto 51 is applied to an ECU (Engine Control Unit) 58 and the ECU 58 operates a pump relay 59 in response to the signal. A fuel pump 60 is operated in response to the operation of the pump relay 59 to perform the fuel injection to the engine.

The ECU 58 reads detection values of a throttle sensor 61A, a water temperature sensor 61B and an intake air temperature sensor 61C and calculates the number of rotation of the engine on the basis of the detection values to control an injector 63 through a dropping resistor 62. The ECU 58 functions to perform the injection of fuel in response to a load and the number of rotation by means of the fuel pump 60.

Further, numeral 64 denotes a CDI (Capacitance Discharge type Igniter). A high voltage is applied to an ignition coil 65 in response to an ignition signal supplied to the CDI 64 from the ECU 58 to thereby ignite the engine by means of an ignition plug 66.

In FIG. 4, numeral 67 denotes a light relay, which is turned on by switching on of a light-on switch 68 and at this time electric power from the battery 53 is supplied to electric loads 69 such as headlights, taillights, brakelights, a warmer of a steering wheel and the like to thereby turn on the headlights and the like.

As described above, the snowmobile always turns on the headlights and the like during traveling usually. Accordingly, when the engine is stopped after traveling, it is necessary to turn off the light-on switch 68 so that the headlights and the like are turn off. However, actually, there is a tendency to forget turning off of the lights in view of the style of traveling peculiar to the snowmobile in which the lights are always turned on. When such a state occurs, there is a problem that the battery 53 is consumed uselessly to thereby get into a so-called dead state of the battery.

OBJECT AND SUMMARY OF THE INVENTION

The present invention has been made in order to improve the above problem in the prior art and an object of the present invention is to provide a headlight control circuit of a snowmobile capable of preventing a battery from being consumed due to forgetting of turning off of electric loads such as headlights by controlling turning on and off of the electric loads in accordance with the number of rotation of an engine.

That is, an object of the present invention is to provide a headlight control circuit of a snowmobile capable of automatically controlling turning on and off of electric loads such as headlights to prevent a battery from being consumed due to forgetting of turning off of a light-on switch.

In order to achieve the above object, according to the present invention, in a power supply circuit of a snowmobile including an EFI system in which an AC voltage of a magneto is converted into a DC voltage to charge a battery and electric power is supplied to an engine control unit through a power relay in response to turning on of a main switch to inject fuel to an engine, there is provided a light relay for supplying electric power from the battery to electric loads such as headlights. Thus, the engine control unit judges a frequency of the AC voltage generated by the magneto to control to turn on or off the light relay in accordance with whether said frequency exceeds a predetermined value or not.

Operation of the present invention is described using reference numerals of FIG. 1.

In the power supply circuit of the snowmobile including the EFI system, the AC voltage of a magneto 51 is converted into a DC voltage to charge a battery 53 and when a main switch 54 is turned on, electric power is supplied to the ECU 58 through a power relay 55 to thereby inject fuel to the engine to be rotated.

In this case, a light relay 1 is provided and when the light relay 1 is turned on, electric power can be supplied to the electric loads 2 such as headlights from the battery 53. Thus, when the ECU 58 judges a frequency of the AC voltage generated by the magneto 51 and detected by a pulser coil 57 and the frequency exceeds a predetermined value, the light relay 1 is controlled to be turned on and when the frequency is reduced to the predetermined value or less, the light relay 1 is controlled to be turned off.

Accordingly, only when the engine is operated with a predetermined rotational number or more, electric power can be controlled to be supplied to the electric loads 2 such as the headlights and the like from the battery 53 and when the rotational number of the engine is reduced to a predetermined value or less, electric power can be controlled not to be supplied to the electric loads 2 such as the headlights and the like from the battery 53.

Further, in the power supply circuit of the snowmobile as described above, the present invention comprises frequency-to-voltage conversion means for converting the frequency of the AC voltage generated by the magneto into a voltage and a transistor circuit for controlling to supply electric power to the loads such as the headlights from the battery or not to supply it in accordance with whether the frequency exceeds a predetermined value or not.

Operation of the present invention is described using reference numerals of FIG. 3.

Transistor circuits 24, 25 and 26 are provided on the output side of the battery 53 and the rotational number of the engine is detected by means of frequency-to-voltage conversion means 30 to turn on the transistor circuits 24, 25 and 26 so that electric loads 27 are driven. Accordingly, when the engine is stopped, the headlights and the like are turned off automatically. Thus, it can be prevented that the battery is dead due to forgetting of turning off of the headlights and the like.

DETAILED DESCRIPTION OF THE PREFERRED EMBODIMENTS

Figure 1:
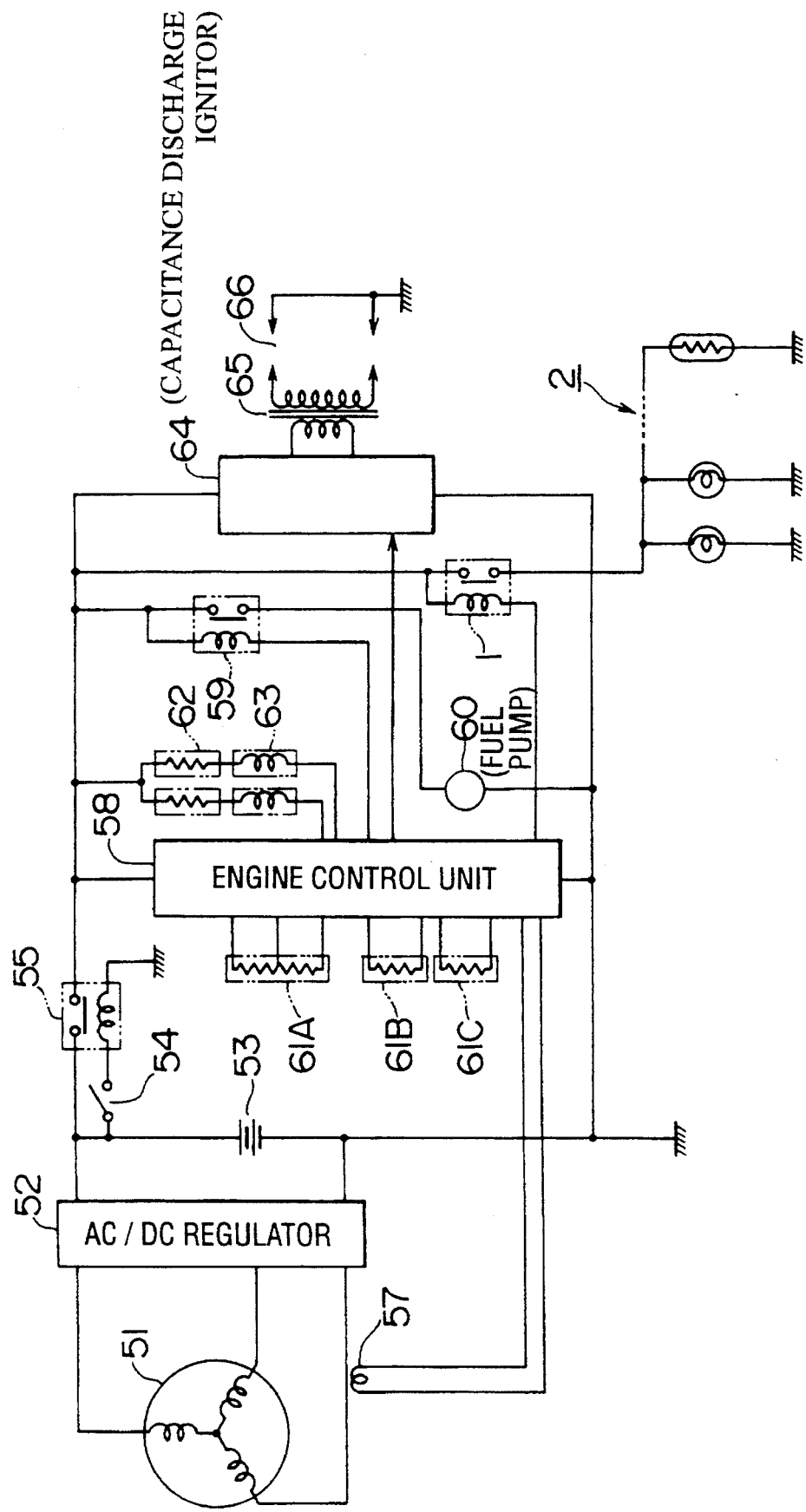
FIG. 1 is a block diagram schematically illustrating a first embodiment of the present invention.
Figure 2:
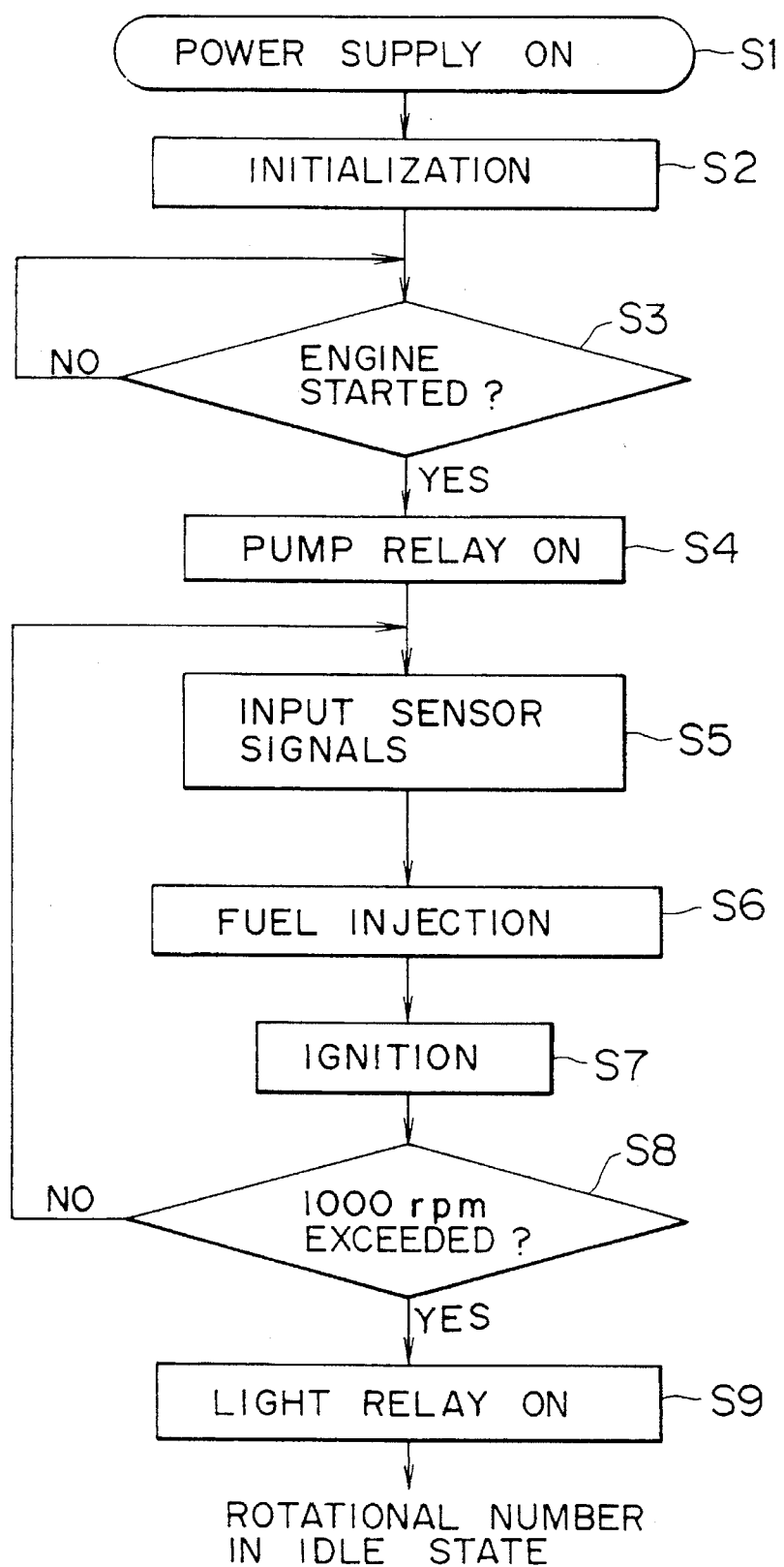
FIG. 2 is a flow chart showing operation of the first embodiment of the present invention illustrated in FIG. 1.

A first embodiment of the present invention is now described with reference to FIGS. 1 and 2. The embodiment illustrated in FIGS. 1 and 2 is directed to a power supply circuit of a snowmobile having an EFI system in which an AC voltage of a magneto 51 is converted into a DC voltage to charge a battery 53 and electric power is supplied to an ECU 58 through a power relay 55 in response to turning on of a main switch 54 so that fuel is injected to an engine. The power supply circuit includes a light relay 1 for supplying electric power from the battery 53 to electric loads 2 such as headlights and the like. The ECU 58 detects a frequency of the AC voltage generated by the magneto 51 and the light relay 1 is controlled to be turned on and off in accordance with whether the frequency exceeds a predetermined value or not.

Figure 4:
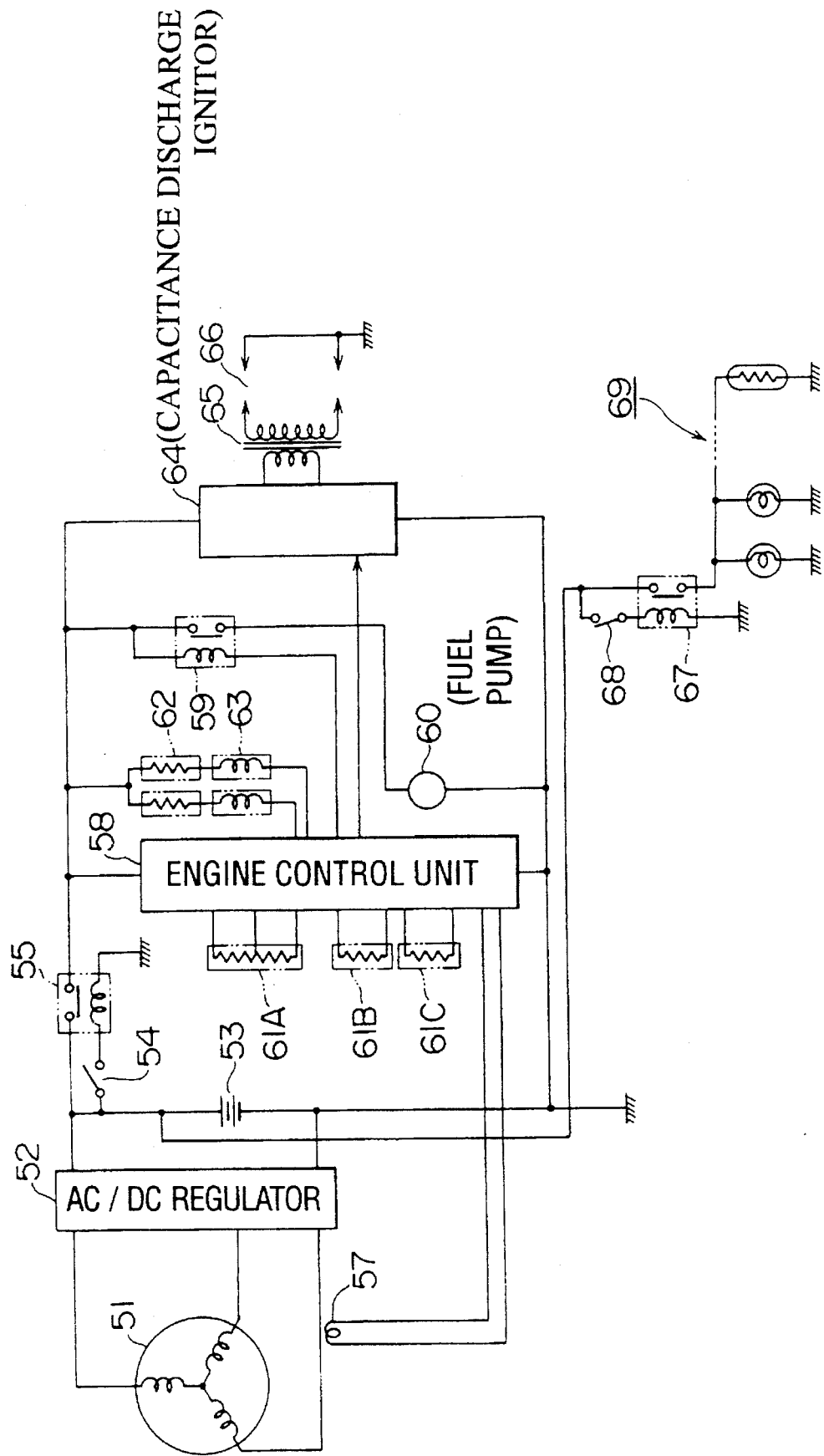
FIG. 4 is a block diagram schematically illustrating a conventional headlight control circuit of a snowmobile.

FIG. 1 schematically illustrates a first embodiment of the present invention. In FIG. 1, the same elements as those of FIG. 4 are designated by the same numerals and since operation thereof is the same as that in FIG. 4, detailed description thereof is omitted.

In FIG. 1, numeral 1 denotes a light relay for supplying electric power to the electric loads such as the headlights and the like as described above. Numeral 2 denotes the electric loads such as headlights, taillights, brakelights, a warmer of a steering wheel and the like which are driven or operated through the light relay 1. FIG. 2 is a flow chart showing operation of the first embodiment illustrated in FIG. 1.

Operation of the first embodiment is now described with reference to FIGS. 1 and 2.

First of all, when the main switch 54 is turned on (step S1), a program of the ECU 58 is started. After each portion of the power supply circuit is initialized (step S2), the circuit becomes a waiting state for waiting for a start signal (step S3).

In such a waiting state, when the engine is started, the pump relay 59 is turned on (step S4) and a signal of the number of rotation from the pulser coil 57, a throttle opening signal from the throttle sensor 61A, a cooling water temperature signal from the water temperature sensor 61B and an engine intake air temperature signal from the intake air temperature sensor 61C are supplied to the ECU 58 (step S5). The ECU 58 makes calculation on the basis of these input data and performs injection of a proper amount of fuel at a proper timing (step S6), so that the ignition operation is performed by the ignition plug 66 through the CDI 64 in response to the injection of fuel (step S7).

When the number of rotation of the engine is increased gradually and it is judged that the number of rotation reaches, for example, 1000 rpm or more (step S8), the light relay 1 is turned on by a control signal from the ECU 58 to supply electric power to the electric loads 2.

The number of rotation of the engine in the idle state is usually about 1800 rpm and accordingly in the circuit of FIG. 1 as far as the engine is operated, the headlights and the like constituting the electric load 2 can be always turned on. On the other hand, when the main switch 54 is turned off and the engine is stopped, the light relay 1 is turned off and all of the electric loads 2 such as the headlights, the taillights, the brakelight and the warmer of the steering wheel are not supplied with electric power.

As described above, according to the first embodiment of the present invention, there is provided the light relay 1 for supplying electric power from the battery 53 to the electric loads and the ECU 58 detects the rotational number of the engine to turn on the light relay 1 so that the electric loads 2 are driven or operated. Accordingly, when the engine is stopped, the headlights and the like are also turned off automatically. Therefore, it can be prevented that the battery is dead due to forgetting of turning off of the lights.

Figure 3:
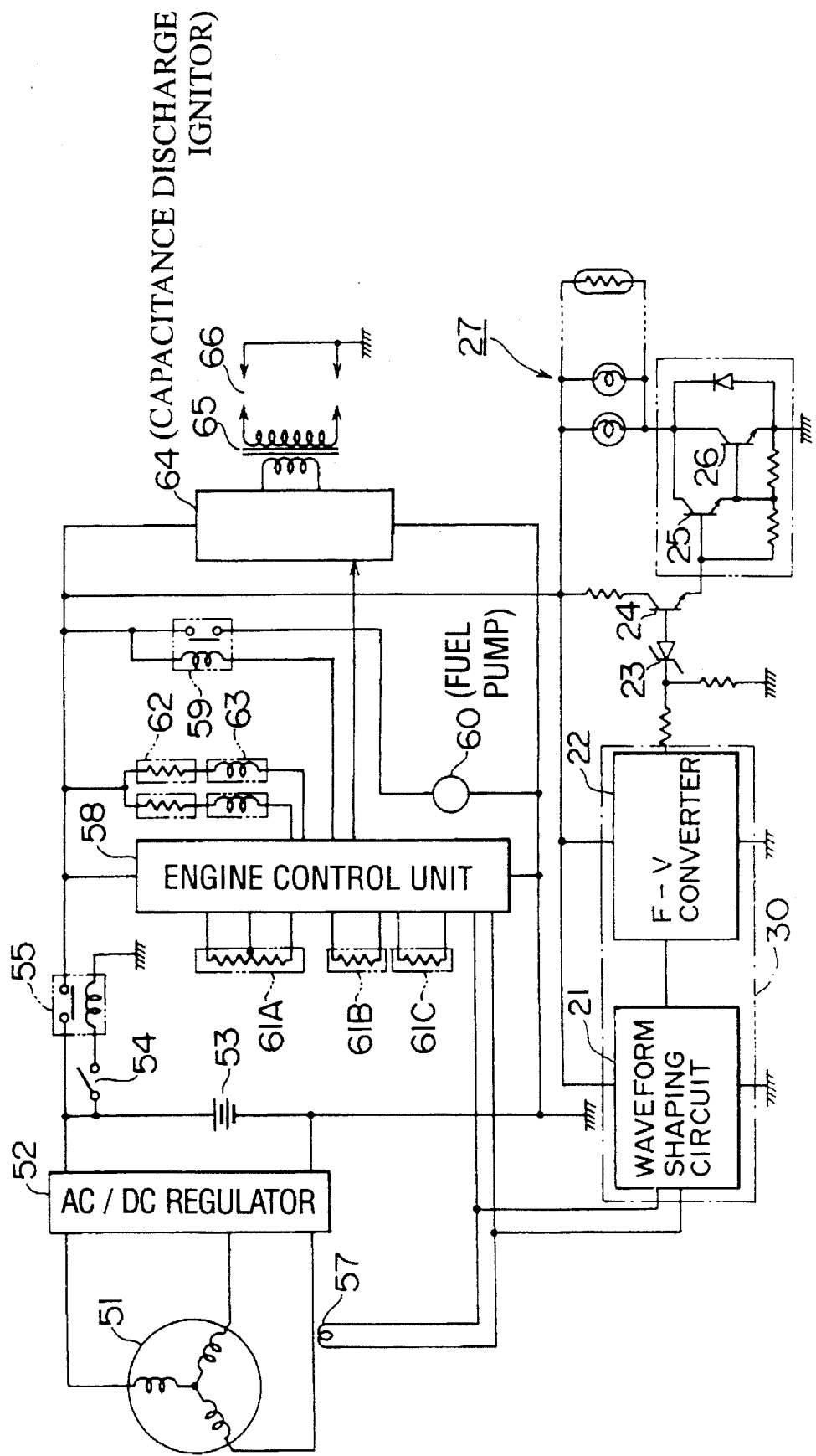
FIG. 3 is a block diagram schematically illustrating a second embodiment of the present invention.

FIG. 3 schematically illustrates a second embodiment of the present invention. In the second embodiment illustrated in FIG. 3, the power supply circuit of the snowmobile having the EFI system in which the AC voltage of the magneto 51 is converted into the DC voltage to charge the battery 53 and electric power is supplied to the ECU 58 through the power relay 55 in response to the on state of the main switch 54 includes frequency-to-voltage conversion means 30 for converting the frequency of the AC voltage generated by the magneto 51 into a voltage and transistor circuits 24, 25 and 26 (switching transistor 24 and Darlington-connected transistors 25 and 26) for controlling to supply a voltage from the battery 53 to electric loads 27 such as headlights and the like or not to supply it in accordance with whether the frequency exceeds the predetermined value or not.

In FIG. 3, the same elements as those of FIG. 4 are designated by the same numerals and since operation of these elements is the same as that in FIG. 4, detailed description thereof is omitted.

In FIG. 3, numeral 21 denotes a waveform shaping circuit for shaping the AC signal of the pulser coil 57 into a square wave signal. Numeral 22 denotes a frequency-to-voltage (F-V) converter for converting a frequency of an output signal of the waveform shaping circuit 21 into a DC voltage. Thus, the waveform shaping circuit 21 and the F-V converter 22 constitute frequency-to-voltage conversion means 30. When the DC voltage produced by the F-V converter 22 exceeds a predetermined breakdown voltage of a zener diode 23, the switching transistor 24 connected to the zener diode is turned on to thereby turn on the power transistor 26 through the transistor 25. Thus, the electric loads 27 such as the headlights, the taillights, the brakelights and the warmer of the steering wheel connected between the transistor 26 and the output of the battery 53 are driven or supplied with the voltage of the battery.

In the second embodiment of the present invention, the transistor circuits 24, 25 and 26 are connected on the side of the output of the battery 53 and the rotational number of the engine is detected by the frequency-to-voltage conversion means 30 composed of the waveform shaping circuit 21 and the F-V converter 22 to turn on the transistor circuits 24, 25 and 26 so that the electric loads 27 are controlled to be driven. Accordingly, when the engine is stopped, the transistor circuits 24, 25 and 26 are turned off on the basis of the output of the frequency-to-voltage conversion means 30 so that the headlights and the like can be automatically turned off to thereby prevent that the battery is dead due to forgetting of turning off of the headlights and the like.

The headlight control circuit of the snowmobile according to the first and second embodiments can be realized only by addition of a simple circuit to the conventional headlight control circuit and is economically advantageous. Further, when such a control is performed by means of the EFI system controlled by a microcomputer, there is a merit that the rotational number of the engine for starting to operate the light-on relay can be easily changed by a software.

As described above, according to the present invention, since the electric loads such as the headlights and the like of the snowmobile are controlled to be turned on and off in accordance with the rotational number of the engine, electric power can be supplied from the battery to the electric loads such as the headlights and the like only when the engine is operated with a predetermined rotational number or more whereas electric power cannot be supplied from the battery to the electric loads such as the headlights and the like when the rotational number of the engine is reduced below a predetermined value and the engine is stopped. Therefore, according to the present invention, there can be provided the excellent headlight control circuit of the snowmobile which can effectively suppress the consumption of the battery due to forgetting of turning off of the headlights and the like.

I claim:

1. In a power supply circuit of a snowmobile including an EFI system in which an AC voltage of a magneto is converted into a DC voltage to charge a battery and electric power is supplied to an engine control unit through a power relay in response to turning on of a main switch to inject fuel to an engine, a headlight control circuit of the snowmobile comprising:
        a light relay for supplying electric power from the battery to electric loads such as headlights;
        said engine control unit judging a frequency of the AC voltage generated by the magneto to control to turn on or off said light relay in accordance with whether or not said frequency exceeds a predetermined value.

2. In a power supply circuit of a snowmobile including an EFI system in which an AC voltage of a magneto is converted into a DC voltage to charge a battery and electric power is supplied to an engine control unit through a power relay in response to turning on of a main switch to inject fuel to an engine, a headlight control circuit of the snowmobile comprising:
        frequency-to-voltage conversion means for converting a frequency of the AC voltage generated by the magneto into a voltage; and
        a transistor circuit for controlling to supply electric power from the battery to electric loads such as headlights to supply said headlights in accordance with whether or not said frequency exceeds a predetermined value.

\* \* \* \* \*